United States Patent [19]

Hanson et al.

[11] 4,260,534

[45] Apr. 7, 1981

[54] ASBESTOS-FREE VINYL FLOOR TILE COMPOSITION AND METHOD FOR ITS MANUFACTURE

[75] Inventors: John G. Hanson, Robbinsville, N.J.; Merrill M. Smith, Morrisville, Pa.

[73] Assignee: American Biltrite, Inc., Lawrenceville, N.J.

[21] Appl. No.: 10,605

[22] Filed: Feb. 8, 1979

[51] Int. Cl.³ .................... C08K 5/12; C08K 3/34; C08K 3/20
[52] U.S. Cl. .................... 260/31.8 R; 260/42.49
[58] Field of Search ............ 260/42.56, 42.49, 31.8 R

[56] References Cited

U.S. PATENT DOCUMENTS

| | | | |
|---|---|---|---|
| 3,502,611 | 3/1970 | Palmer et al. | 260/42.49 |
| 3,775,237 | 11/1973 | Crowley | 428/158 |
| 3,904,579 | 9/1975 | Braddicks | 260/42.46 |
| 4,075,784 | 2/1978 | Pied | 260/42.46 |
| 4,124,562 | 11/1978 | Yui et al. | 260/42.46 |

OTHER PUBLICATIONS

Chem. Abstract-vol. 81 entry 95488z, Parlov et al.

*Primary Examiner*—Joseph L. Schofer
*Assistant Examiner*—Peter F. Kulkosky
*Attorney, Agent, or Firm*—Pennie & Edmonds

[57] ABSTRACT

An asbestos free composition suitable for the manufacture of vinyl floor tile comprises a substantially uniform mixture of a minor portion of vinyl polymer resin and a major portion of mineral filler consisting essentially of calcium carbonate and Kaolin clay. Formulations using such a mineral filler have been found processible into floor tile using the same basic production equipment and process line used in the manufacture of vinyl asbestos tile.

17 Claims, No Drawings

ASBESTOS-FREE VINYL FLOOR TILE COMPOSITION AND METHOD FOR ITS MANUFACTURE

BACKGROUND ART

This invention relates to a composition suitable for the manufacture of vinyl floor tile and, in particular, to a vinyl floor tile composition free of asbestos.

For many years, mineral-filled vinyl floor tiling has utilized asbestos among the mineral filling components. In addition to providing reinforcement in the finished product, such use of asbestos has been particularly advantageous where the vinyl asbestos tile is made in a continuous process with individual tiles being cut from a continuous web or sheet of vinyl asbestos. As detailed in U.S. Pat. No. 3,904,579 which is incorporated herein by reference, the strength of such a web at relatively high processing temperatures and its ability to adhere to calendering rolls is of considerable importance. Specifically, the web must have sufficient hot tensile strength, i.e., the proper amount of viscous flow and melt elasticity at processing temperatures, that the web may be sheeted, calendered, and transported without sporadic ripping, tearing, or excessive elongation during hot processing on the calendering line. Since fibrous fillers, such as asbestos, greatly increase the hot strength of a vinyl composition, they were used in the past whenever needed. A typical formulation of a vinyl-asbestos composition utilizes a minor portion of vinyl polymer resin (typically 12-15% by weight) and a major portion of mineral filler, typically comprising a mixture of about 60% (composition weight) calcium carbonate as a bulking filler and about 20% asbestos as a reinforcing filler. The remainder of the composition is made up of plasticizer, stabilizer, lubricant and pigment.

In recent years manufacturers have, with little apparent success, attempted to reformulate their tile compositions to eliminate asbestos. However, insofar as applicant is aware, these efforts have not heretofore produced a substitute for asbestos in the manufacture of floor tile which would permit the manufacture on existing production equipment of floor tile comparable to vinyl asbestos tile in quality and cost.

Accordingly, there is a need for an asbestos free vinyl composition which can be manufactured into satisfactory floor tile on existing continuous-web tile production equipment.

DISCLOSURE OF THE INVENTION

In accordance with the invention, an asbestos free composition suitable for the manufacture of vinyl floor tile comprises a substantially uniform mixture of a minor portion of vinyl polymer resin and a major portion of mineral filler consisting essentially of calcium carbonate and Kaolin clay. Formulations using such a mineral filler have been found processible into floor tile using the same basic production equipment and process line used in the continuous-web manufacture of vinyl asbestos tile.

BEST MODE FOR CARRYING OUT THE INVENTION

Asbestos-free vinyl floor tile in accordance with the invention is manufactured from a composition comprising a minor proportion of vinyl polymer and a major proportion of a mineral filler consisting essentially of selected bulking agents and Kaoline clay as a reinforcing agent.

The vinyl polymer, as is well known in the art, can be a homopolymer, copolymer or terpolymer of vinyl chloride or combinations thereof. The vinyl chloride copolymer may contain up to 20% vinyl acetate. The vinyl chloride terpolymer may be one such as those described in the above-referenced U.S. Pat. No. 3,904,579 patent and in U.S. Pat. No. 3,991,006 which is likewise incorporated by reference.

The bulking agent is preferably calcium carbonate in the form of crushed limestone or Aragonite. Other bulking agents, such as plate-like talcs (sometimes referred to as "platy talcs"), silicates, sulfates, and other inert fillers, can be utilized in conjunction with the preferred limestone bulking agent.

The Kaolin clay is preferably SNOBRITE clay marketed by Thompson, Weinman & Co., East Orange, N.J. The chemical composition and physical constants of the preferred SNOBRITE Kaolin clay are set forth below in Tables 1 and 2, respectively.

TABLE 1

| Chemical Composition of SNOBRITE Clay | |
|---|---|
| Ingredient | Weight Percentage |
| $Al_2O_3$ | 39.5 + 1% |
| $SiO_2$ | 44.5 ± 1% |
| $TiO_2$ | 0.5 ± 0.25% |
| $Fe_2O_3$ | 0.4 ± 0.25% |
| CaO | 0.25 ± 0.25% |
| $H_2O$ | 1.0% |

Upon ignition, there is a loss of approximately 14% by weight in the foregoing composition.

TABLE 2

| Physical Constants of SNOBRITE Clay | |
|---|---|
| Constant | Value |
| Dry Pigment Brightners (Green Filter) | 87.0 ± 1% |
| Screen Fineness (Min. thru 325 mesh) | 99.5% |
| Particle Size Distribution | |
| Less than 44 microns | 99.85% |
| Less than 10 microns | 96% |
| Less than 2 microns | 83% |
| Less than 1 micron | 75% |
| PH | 6.0 ± 0.5 |
| Bulking Value | 0.0465 gals./lb. |
| Dry Bulk (loose) | 30 lbs./cu.ft. |

The vinyl polymer resin is 10 to 20% by weight of the composition, the Kaolin clay is 10 to 40% and the bulking agent is about 35 to 64% by weight of the composition. Where a plate-like talc is used, it may be used in amounts from approximately 5 to 30%, by weight of the composition. Minor proportions of plasticizer such as butylbenzyl phthalate, dioctyl phthalate, or tricresyl phosphate, stabilizer such as dicyandiamide, pigment such as titanium dioxide and lubricant such as stearic acid or calcium stearate are added as needed in conventional amounts. As a result, the percentage weight of the plasticized vinyl polymer resin ranges from about 16 to 25%.

In preferred compositions, the Kaolin clay is about 20% of the composition. A preferred composition for use in manufacturing ⅛ inch and 3/32 inch floor tile is set forth in Table 3, below.

TABLE 3

| Component | Weight Percent |
| --- | --- |
| Vinyl Copolymer | 13.8 |
| Dicyandiamide | 0.7 |
| Kaolin Clay | 19.1 |
| Aragonite (CaCO$_3$) | 44.7 |
| 2005 Filler - 10 mesh (CaCO$_3$) | 10.2 |
| 2055 Filler - 200 mesh (CaCO$_3$) | 6.4 |
| Plasticizer (phthalate type) | 5.1 |
| | 100.0 |

A preferred composition for manufacturing 0.08 inch and 1.16 inch tile is given in Table 4, below.

TABLE 4

| Component | Weight Percent |
| --- | --- |
| Vinyl Copolymer | 13.2 |
| Plasticizer (phthalate type) | 4.9 |
| Dicyandiamide | 0.7 |
| Kaolin Clay | 20.0 |
| 2055 Filler - 200 mesh (CaCO$_3$) | 5.5 |
| Aragonite (CaCO$_3$) | 55.7 |

Floor tiles are manufactured from these compositions on the same basic equipment and by the same basic processing steps used in the continuous-web manufacture of vinyl asbestos tile. Thus, asbestos free floor tiles are made by the steps of mixing the components as in a Banbury mixer, milling the resulting mix, sheeting and calendering the milled product, heating, planishing and die cutting.

Preferably, the components are pre-blended before loading into the Banbury. If not, the preferred sequence of loading is (1) Kaolin clay, (2) copolymer resin, (3) pigment, (4) stabilizer, (5) Aragonite (CaCO$_3$) and plasticizer, simultaneously. The Banbury mix time typically falls within 50 to 90 seconds, and the temperature may range from 260° F. to 305° F. with 285° F. preferred. As a result, a substantially uniform mixture is produced.

To mill a good pad of suitable thickness between 0.5 inches and 1.5 inches, the front roll is heated to a temperature between 220° F. and 260° F., with 240° F. preferred, and the back roll is heated to a temperature between 265° F. and 330° F. with 290° F. preferred.

At the sheeter, the front roll is heated to a temperature between 175° F. and 210° F., with 190° F. being standard. The back roll is heated to between 230° F. and 330° F. with 250° F. preferred. The gauge out of the sheeter varies depending on the ultimate thickness desired. A sheeter output gauge of 0.230 inch is typically used in making ⅛ inch tile.

After sheeting, the product is subjected to two successive calendering operations. In the case of ⅛ inch tile, the output gauge of the first calender is 0.140 inch and the output gauge of the second calender is about 0.121 inch. In each calender, the top roll is heated to 205° F. to 230° F. with 220° F. standard, and the bottom roll is heated to 265° F. to 330° F. with 300° F. standard.

At the planisher, the chrome top roll is heated to 200° F.-225° F. with 210° F. standard and the bottom rubber roll is cooled with surface water spraying.

The planished sheet is cooled by air and water from about 210° F. to about 125° F. for die cutting. After die cutting, the tiles are cooled by chilled air to a temperature of about 90° F. and packaged.

Heaters can be provided between (1) the sheeting and calendering operations (2) between the two calendering operations (3) between calendering and planishing, to adjust and maintain the sheet surface temperature.

The advantages of a Kaolin clay filler in the vinyl floor tile composition are manifold. (1) The clay imparts a greater hot tensile strength than is imparted by calcium carbonate fillers. (2) The clay imparts a better mill tack, approximating that of vinyl asbestos compositions and eliminating any requirement for tackifying resins. (3) The preferred formulations using about 20% clay exhibit improved surface finish and abrasion resistance as compared to formulations using only calcium carbonate filler. And (4) the clay imparts a greater dimensional stability to the finished tile than is present in formulations filled with calcium carbonate only.

While the invention has been described in connection with a small number of preferred specific embodiments, it is to be understood that these are merely illustrative of the many other specific embodiments which can also utilize the principles of the invention. Thus, numerous and varied formulations and products can be made by those skilled in the art without departing from the spririt and scope of the present invention.

I claim:

1. In a composition suitable for the manufacture by a continuous process of vinyl floor tile of the type comprising a minor proportion of plasticized vinyl chloride polymer and a major proportion of mineral filler, said plasticized vinyl chloride polymer constituting about 16 to 25% by weight of the composition and being substantially uniformly mixed with said mineral filler, the improvement wherein said mineral filler comprises an asbestos free mixture consisting essentially of a Kaolin clay and bulking agent, said Kaolin clay constituting about 10 to 40% by weight of the composition and said mineral filler constituting about 35 to 64% by weight of the composition.

2. The composition according to claim 1 wherein said Kaolin clay comprises about 20% by weight of said composition.

3. The composition of claim 1 wherein said bulking agent is calcium carbonate.

4. The composition of claim 1 wherein said bulking agent comprises plate-like talcs constituting about 5 to 30% by weight of the composition and calcium carbonate.

5. The composition according to claim 1 wherein said Kaolin clay comprises by weight, the following components in the percentage ranges:

| Ingredient | Weight Percentage |
| --- | --- |
| Al$_2$O$_3$ | 39.5 ± 1% |
| SiO$_2$ | 44.5 ± 1% |
| TiO$_2$ | 0.5 ± 0.25% |
| Fe$_2$O$_3$ | 0.4 ± 0.25% |
| CaO | 0.25 ± 0.25% |
| H$_2$O | 1.0% |

6. The composition according to claim 1 comprising substantially the following components by weight:

| Component | Weight Percent |
| --- | --- |
| Vinyl Copolymer | 13.8 |
| Dicyandiamide | 0.7 |

-continued

| Component | Weight Percent |
|---|---|
| Kaolin Clay | 19.1 |
| Aragonite (CaCO$_3$) | 44.7 |
| 2005 Filler - 10 mesh (CaCO$_3$) | 10.2 |
| 2055 Filler - 200 mesh (CaCO$_3$) | 6.4 |
| Plasticizer (phthalate type) | 5.1 |

7. The composition according to claim 1 comprising substantially the following components by weight:

| Component | Weight Percent |
|---|---|
| Vinyl Copolymer | 13.2 |
| Plasticizer (phthalate type) | 4.9 |
| Dicyandiamide | 0.7 |
| Kaolin Clay | 20.0 |
| 2055 Filler - 200 mesh (CaCO$_3$) | 5.5 |
| Aragonite (CaCO$_3$) | 55.7 |

8. The composition of claim 1 wherein the vinyl chloride polymer is a copolymer containing up to approximately 20% vinyl acetate.

9. A vinyl floor tile manufactured from the composition of claim 1, 2, 3, 4, 5, 6, 7 or 8.

10. A process for producing an asbestos-free vinyl sheet using equipment capable of producing a vinyl asbestos sheet, said process comprising the steps of:
    forming a substantially uniform mixture comprising a minor proportion of plasticized vinyl chloride polymer and a major proportion of mineral filler, said plasticized vinyl chloride polymer constituting about 16 to 25% by weight of the composition and being substantially uniformly mixed with said mineral filler, said mineral filler comprising an asbestos free mixture consisting essentially of a Kaolin clay and bulking agent, said Kaolin clay constituting about 10 to 40% by weight of the composition and said mineral filler constituting about 35 to 64% of the composition; and
    milling and calendering said mixture to form a vinyl sheet.

11. The method of claim 10 wherein said Kaolin clay comprises about 20% by weight of said composition.

12. The method of claim 10 wherein said bulking agent is calcium carbonate.

13. The method of claim 10 wherein said bulking agent comprises plate-like talcs constituting about 5 to 30% by weight of the composition and calcium carbonate.

14. The method according to claim 10 wherein said Kaolin clay comprises by weight, the following components in the percentage ranges:

| Ingredient | Weight Percentage |
|---|---|
| Al$_2$O$_3$ | 39.5 ± 1% |
| SiO$_2$ | 44.5 ± 1% |
| TiO$_2$ | 0.5 ± 0.25% |
| Fe$_2$O$_3$ | 0.4 ± 0.25% |
| CaO | 0.25 ± 0.25% |
| H$_2$O | 1.0% |

15. The method according to claim 10 comprising substantially the following components by weight:

| Component | Weight Percent |
|---|---|
| Vinyl Copolymer | 13.8 |
| Dicyandiamide | 0.7 |
| Kaolin Clay | 19.1 |
| Aragonite (CaCO$_3$) | 44.7 |
| 2005 Filler - 10 mesh (CaCO$_3$) | 10.2 |
| 2055 Filler - 200 mesh (CaCO$_3$) | 6.4 |
| Plasticizer (phthalate type) | 5.1 |

16. The method according to claim 10 comprising substantially the following components by weight:

| Component | Weight Percent |
|---|---|
| Vinyl Copolymer | 13.2 |
| Plasticizer (phthalate type) | 4.9 |
| Dicyandiamide | 0.7 |
| Kaolin Clay | 20.0 |
| 2055 Filler - 200 mesh (CaCO$_3$) | 5.5 |
| Aragonite (CaCO$_3$) | 55.7 |

17. The method of claim 10 wherein the vinyl chloride polymer is a copolymer containing up to approximately 20% vinyl acetate.

* * * * *

UNITED STATES PATENT AND TRADEMARK OFFICE
CERTIFICATE OF CORRECTION

PATENT NO. : 4,260,534
DATED : April 7, 1981
INVENTOR(S) : John G. Hanson, et al.

It is certified that error appears in the above—identified patent and that said Letters Patent is hereby corrected as shown below:

Column 2, line 1, "Kaoline" should read -- Kaolin --

Column 3, line 16, "1.16" should read -- 1/16 --

Column 4, lines 30 and 31, "vinyl chloride polymer" should read -- vinyl chloride/vinyl acetate copolymer --

Column 4, line 39, "mineral filler" should read -- bulking agent --

Column 5, line 43, "mineral filler" should read -- bulking agent --.

Signed and Sealed this

Twenty-seventh Day of July 1982

[SEAL]

Attest:

Attesting Officer

GERALD J. MOSSINGHOFF
Commissioner of Patents and Trademarks